(12) United States Patent
Burshan et al.

(10) Patent No.: US 7,970,878 B1
(45) Date of Patent: Jun. 28, 2011

(54) METHOD AND APPARATUS FOR LIMITING DOMAIN NAME SERVER TRANSACTION BANDWIDTH

(75) Inventors: Chen Yehezkel Burshan, Tel-Aviv (IL); Ian Michael Cotton, Reading (GB); Michael Manning, Reading (GB); Gregory John Wilkins, Colletta di Castelbianco (IT)

(73) Assignee: Cisco Technology, Inc., San Jose, CA (US)

( * ) Notice: Subject to any disclaimer, the term of this patent is extended or adjusted under 35 U.S.C. 154(b) by 812 days.

(21) Appl. No.: 11/281,252

(22) Filed: Nov. 16, 2005
(Under 37 CFR 1.47)

(51) Int. Cl.
*G06G 15/173* (2006.01)
(52) U.S. Cl. .............................. 709/223; 370/255; 726/3
(58) Field of Classification Search .................. 709/223; 370/255; 726/3
See application file for complete search history.

(56) References Cited

U.S. PATENT DOCUMENTS

| 6,388,992 | B2* | 5/2002 | Aubert et al. ................. | 370/232 |
|---|---|---|---|---|
| 2001/0052007 | A1* | 12/2001 | Shigezumi .................... | 709/223 |
| 2002/0002686 | A1* | 1/2002 | Vange et al. .................. | 713/201 |
| 2002/0141341 | A1* | 10/2002 | Haggar et al. ................. | 370/232 |
| 2003/0070096 | A1* | 4/2003 | Pazi et al. ..................... | 713/201 |
| 2003/0118005 | A1* | 6/2003 | Ostberg et al. ................ | 370/352 |
| 2004/0049596 | A1* | 3/2004 | Schuehler et al. ............. | 709/238 |
| 2006/0007860 | A1* | 1/2006 | Komisky ...................... | 370/230 |
| 2006/0020715 | A1* | 1/2006 | Jungck ......................... | 709/246 |
| 2006/0036720 | A1* | 2/2006 | Faulk, Jr. ...................... | 709/223 |
| 2006/0146816 | A1* | 7/2006 | Jain ............................... | 370/389 |
| 2006/0153204 | A1* | 7/2006 | Wang et al. ................... | 370/400 |
| 2006/0242321 | A1* | 10/2006 | Hegde et al. .................. | 709/245 |
| 2007/0002769 | A1* | 1/2007 | Matityahu et al. ............ | 370/255 |
| 2007/0113290 | A1* | 5/2007 | Charles et al. ................. | 726/27 |
| 2008/0028073 | A1* | 1/2008 | Trabe et al. ................... | 709/225 |

FOREIGN PATENT DOCUMENTS

JP 2001203762 A * 7/2001

OTHER PUBLICATIONS

Robertson, "Break on Through" Information Security, Pub Date: May 2001.*
Kaminsky, Dan. "Black Ops of DNS" pp. 1-32. Pub. Date: 2004.*
Cisco, "Cisco Traffic Anomaly Detector Module and Cisco Anomaly Guard Module," Design Guide, Cisco Systems copyright 1992-2005, 12 pages.
Cisco,"Cisco Subscriber Edge Services Manager Introduction Guide—SESM 3.3," Copyright 2002-2005, Text Part No. OL-5365-01, 38 pages.
Cisco, "Cisco Subscriber Edge Services Manager Profile Management Guide—SESM 3.3," Copyright 2002-2005, Text Part No. OL-2064-04, 198 pages.
Cisco, "Cisco Traffic Anomaly Detector Module Configuration Guide—for the Cisco Catalyst 6500 Series Switch and Cisco 7600 Router," Copyright 2005, Text Part No. OL-6589-01, 230 pages.
Cisco, "Cisco Guard and Traffic Anomaly Detector Hardware Installation and Configuration Note," Copyright 2005, Text Part No. OL-8668-01, 54 pages.

(Continued)

*Primary Examiner* — Krista M Zele
*Assistant Examiner* — James Q Forman
(74) *Attorney, Agent, or Firm* — Hickman Palermo Truong & Becker LLP (57) ABSTRACT

A method of limiting domain name server (DNS) transaction bandwidth comprises intercepting one or more DNS packets, examining said one or more packets for the presence of a suspect transaction criterion and, if said suspect transaction criterion is present, implementing a transaction bandwidth limitation action.

17 Claims, 8 Drawing Sheets

600

DETECT SUSPECT DNS PACKET

602

PERFORM PRECONFIGURED ACTION

OTHER PUBLICATIONS

Cisco, "Cisco Subscriber Edge Services Manager Administration and Configuration Guide—SESM 3.3," Copyright 2002-2005, Text Part No. OL-5366-01, 234 pages.

Screaming Electronic Forums, "Tunnel *everything* over DNS," hosted by Pretty Red Star, Copyright 200-2006 by Jelsoft Enterprises Ltd., Original Posting by "Atlas" on Aug. 10, 2004, 5 pages.

Robertson, Paul D., "Break On Through," Information Security—The Authority in Security News, Insight and Analysis, May 2001, 3 pages.

Slashdot—news for nerds, stuff that matters, "IP Tunneling Through Nameservers," posted by Cmdr-Taco on Sep. 10, 2000, 7 pages.

Wilkins, Greg, et al., "Subject: Re: Method and Apparatus for limiting usability of tunneling over DNS usability", Email from inventor dated Nov. 14, 2005, 1 page.

www.zoneedit.com, "Frequently Asked Questions", retrieved from internet: < www.zoneedit.com/doc/faq.html? >, dated Jun. 23, 2009, 17 pages.

* cited by examiner

--Prior Art--

--Prior Art--

METHOD AND APPARATUS FOR LIMITING DOMAIN NAME SERVER TRANSACTION BANDWIDTH

FIELD OF THE INVENTION

The present invention generally relates to domain name server transactions. The invention relates more specifically to a method and apparatus for limiting domain name server transaction bandwidth.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a network such as a public wireless local area network (PWLAN) or "hotspot", user devices such as a laptop, cell phone or personal digital assistant (PDA) are typically authorized upon connection to the network and an appropriate billing method applied. For example referring to FIG. 1 which is an illustrative network diagram of a PWLAN designated generally 100 a user device 102 connects to a network gateway 104 providing access to a network 106 such as the Internet. The user device 102 can communicate with a host device 108, for example providing an application function. For example the gateway 104 can be a Subscriber Service Gateway (SSG) of the type provided by Cisco Technologies Inc of San Jose, Calif. and as described in the document "index.html" at the location "/univercd/cc/td/doc/solution/sesm/sesm_33x" on the domain "cisco.com" on the World Wide Web.

Figure 1:
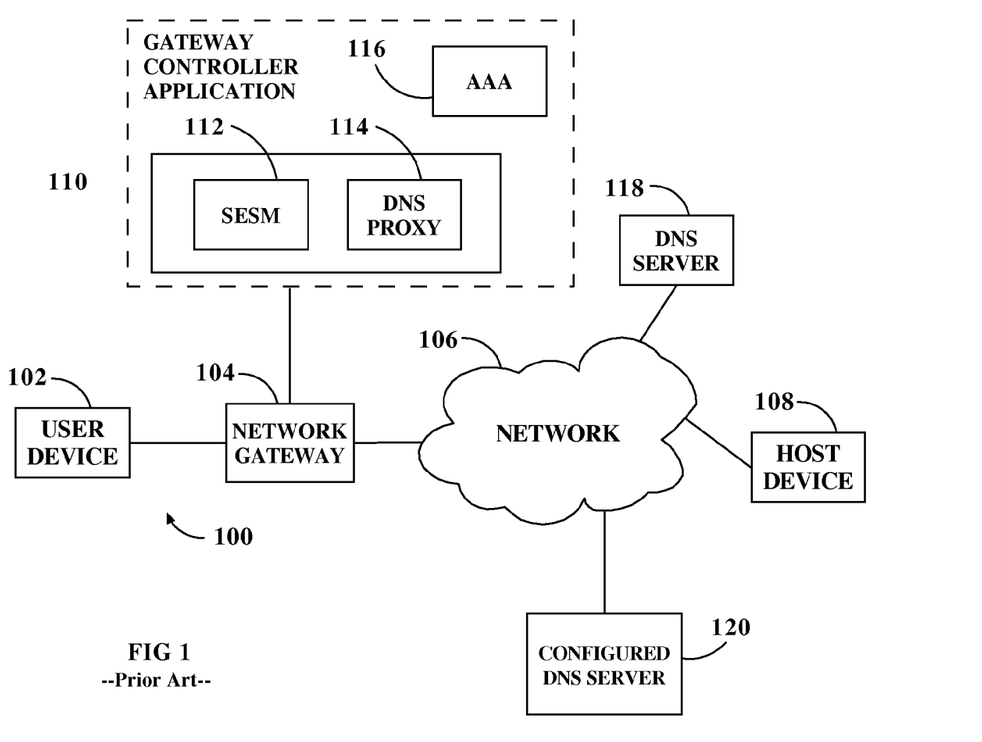
FIG. 1 is a block diagram showing the components of a PWLAN network.

In order to enforce user authentication and provide payment service for example for Internet access, the SSG communicates with a gateway controller application provided locally at 110. The gateway controller application can include, for example, a Subscriber Edge Service Manager (SESM) 112, a domain name server proxy 114 and an authorization, authentication and accounting (AAA) server 116.

Figure 2:
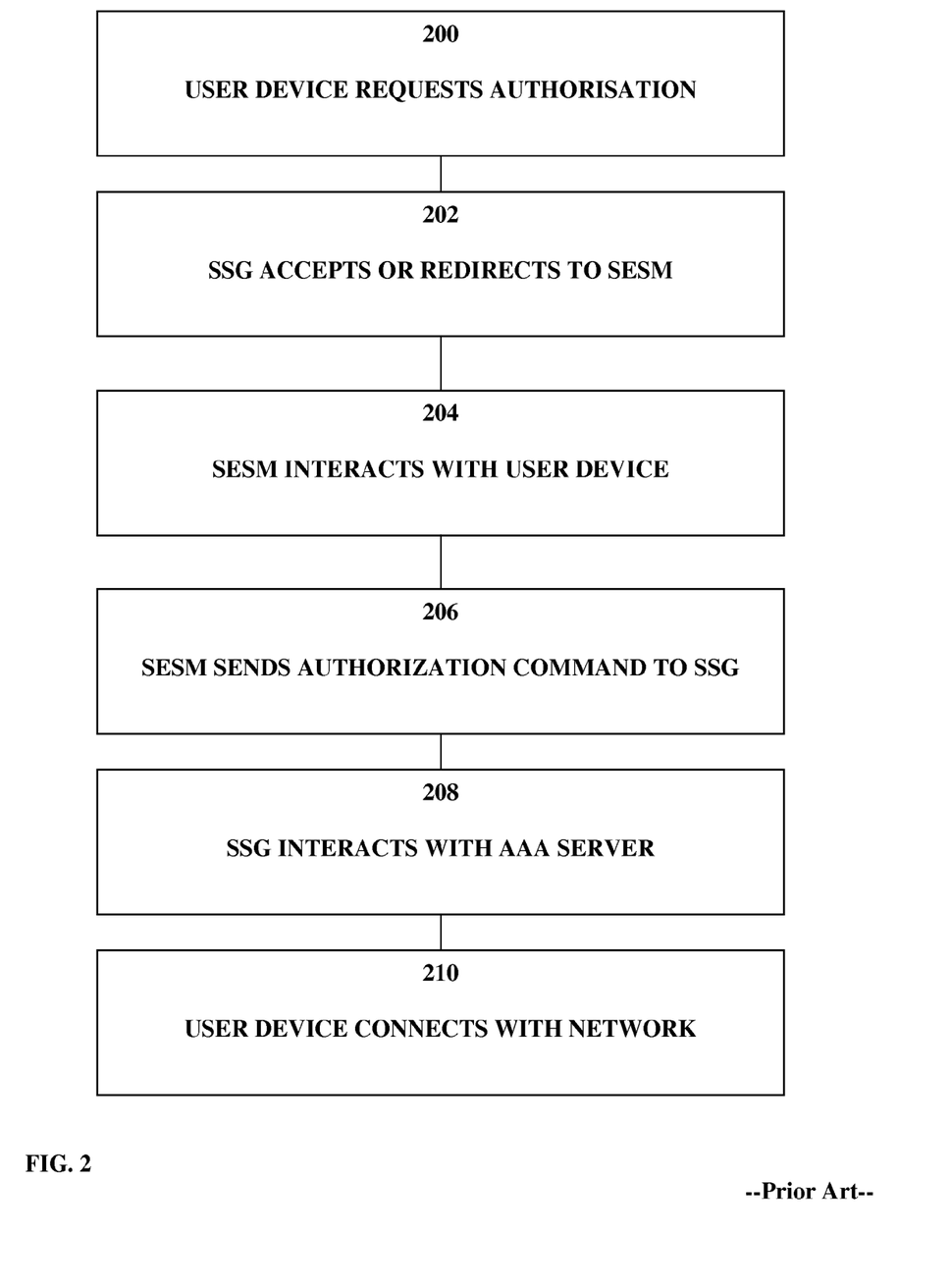
FIG. 2 is a flow diagram illustrating authorization of a user device in PWLAN.

Referring to FIG. 2 which is a flow diagram illustrating the steps involved in connection of a user device to such a network, at step 200 a user device requests access to an application hosted at 108 authorization and at step 202 the SSG 104 either permits the request or redirects the user's HTTP traffic to the SESM portal 112. At step 204 the SESM carries out an authorization transaction with the user device and at step 206. At step 208 the SSG interacts with the AAA server 116 to establish session parameters such as the policy to be applied to the session and at step 210, once authentication is established, the user device is allowed to connect with the network and select for use the desired' service such as Internet service or provision of an application function by a host.

One transaction that may be requested by the user device 102 is a domain name resolution service requiring connection to a domain name server (DNS). The operation of DNS is well understood by the skilled reader and well documented in previous existing documentation and therefore is only described in summary here for the purpose of ease of understanding. In particular a name server or DNS server for example as shown at 118 in FIG. 1 maintains a database of address (A) records associating domain names of the form, for example, www.aaa.bbb with a corresponding IP address of the form xxx.xxx.xxx.xxx. Accordingly the user device needing to access a network location such as host 108 described by a domain name can retrieve the IP address by sending an appropriate DNS request. In practice DNS services are typically distributed amongst multiple name servers and DNS requests may be transferred from higher domain name servers down to lower level domain name servers in a hierarchical manner.

Figure 3:
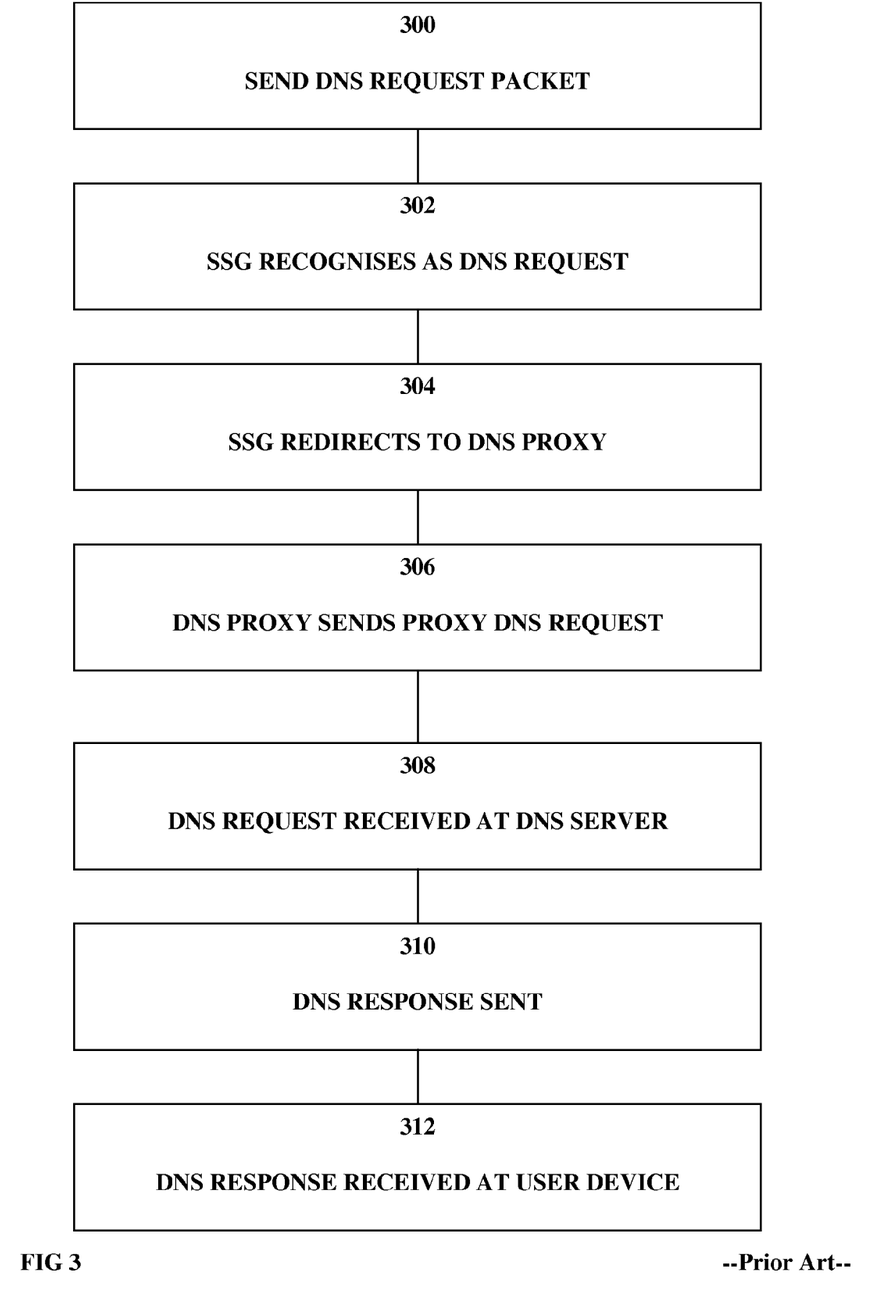
FIG. 3 is a flow diagram illustrating a DNS transaction.
Figure 4:
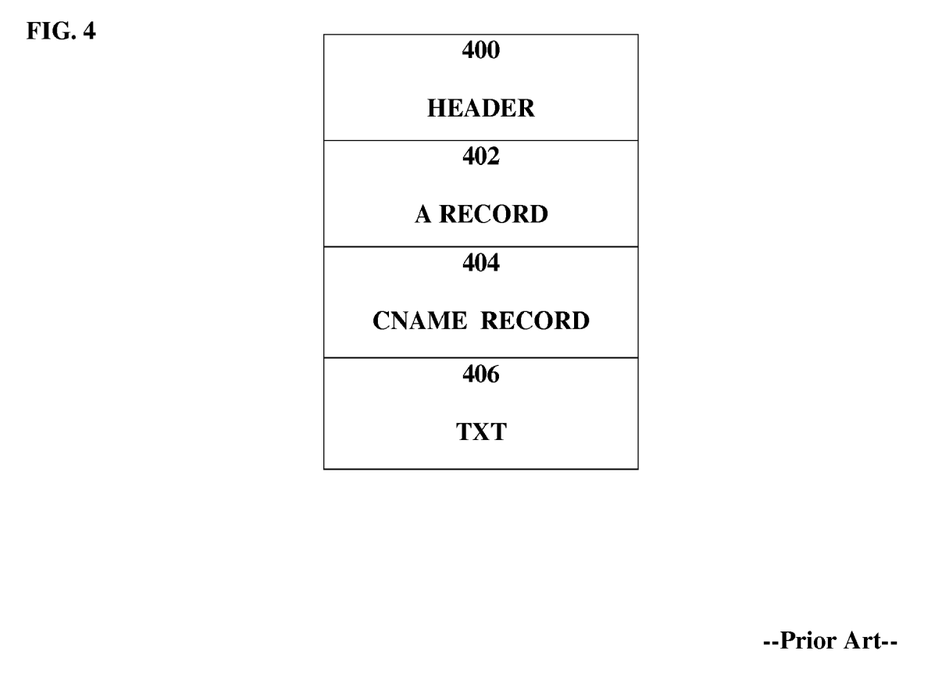
FIG. 4 is a block diagram showing a DNS packet.

The DNS transaction can be further understood with reference to FIG. 3 which is a flow diagram showing the steps involved and FIG. 4 which is a schematic diagram of a DNS request. At step 300 the user device sends a DNS request packet and at step 302 the SSG receives a packet and recognizes it as a DNS request. All DNS requests are received on UDP port 53 allowing simple recognition by the SSG. At step 304 the SSG redirects the DNS request to the DNS proxy 114. As is well known, the DNS proxy sends out a proxy DNS request with itself as source address such that DNS responses are received at it. This reduces the risk of malicious interception of DNS transactions which could take place if the user device were connected directly with the DNS server. At step 306 the DNS proxy sends a proxy DNS request to the DNS server. At step 308, the DNS request is received at the DNS server which may involve the request being passed through a hierarchy of servers as appropriate and at step 310 a DNS response is sent from the ultimate DNS server back to the DNS proxy, containing a resolved IP address. At step 312 the DNS response is received at the DNS proxy and forwarded by the SSG to the user device which can then apply for access to the resolved IP address.

The nature of a DNS packet can be seen from FIG. 4 as including a DNS header 400 and records 402, 404, 406 of known type comprising, for example, an A record, a CNAME record and a text (TXT) record. The CNAME and TXT records are able to carry payloads of approximately 110b and 220b respectively.

It is known, however, to use the DNS protocol to tunnel traffic over DNS and hence obtain free access in the event that an SSG does not require authorization for a DNS transaction. In particular use is made of the payload available in the record fields to package IP packets. A specially configured DNS client is implemented on the user device and a specially configured DNS server is provided remotely on the Internet allowing composition of packaged DNS requests and responses and parsing and decomposition of received DNS requests and responses.

Figure 5:
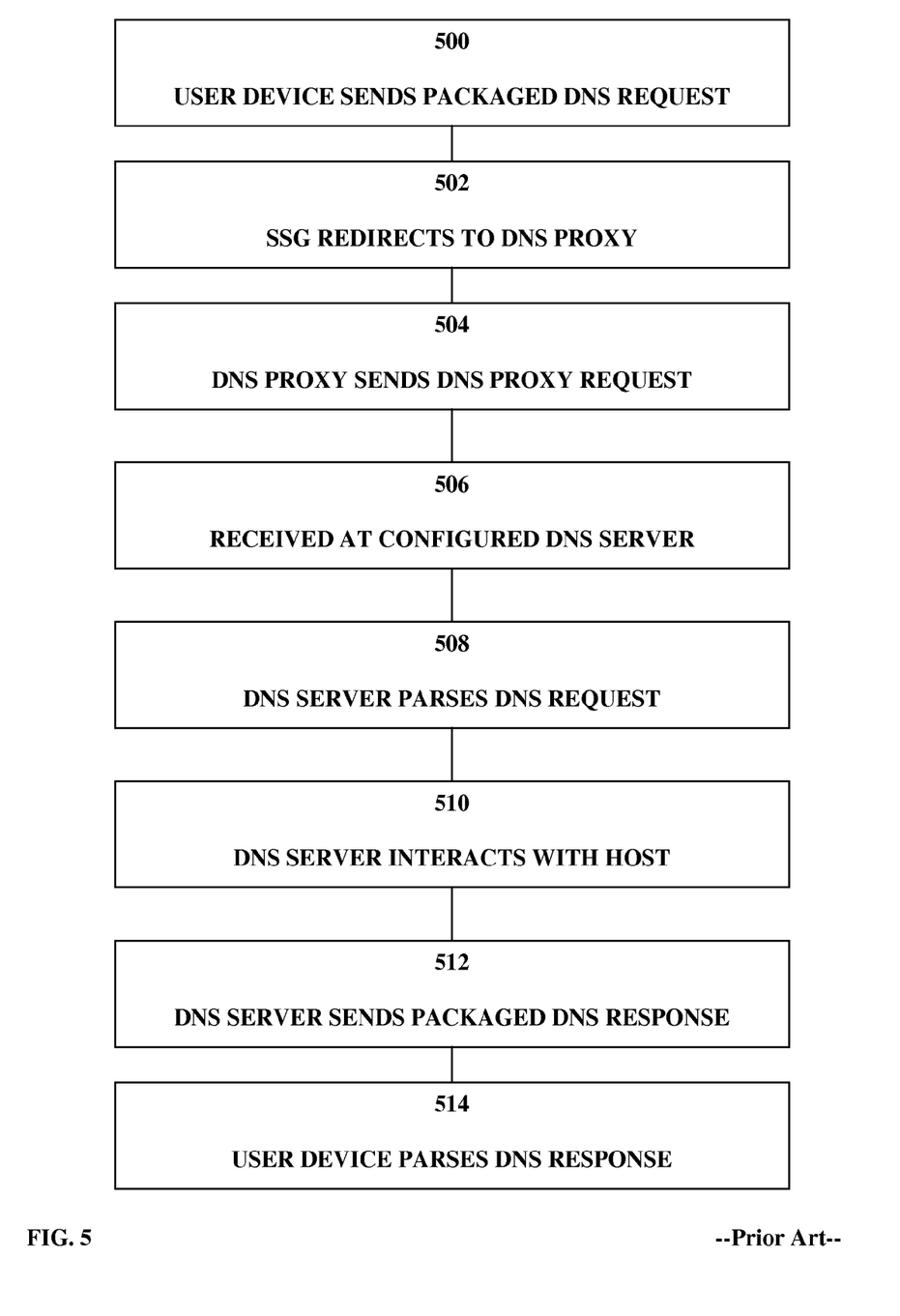
FIG. 5 is a flow diagram illustrating DNS tunneling.

Referring to FIG. 5, which is a flow diagram illustrating the steps involved in tunneling traffic over DNS, at step 500 the user device sends a packaged DNS request and step 502 the SSG redirects the DNS request to the DNS proxy. At step 504 the DNS proxy sends a proxy DNS request via a local DNS server which is received at the specially configured DNS server by virtue of the hierarchical nature of DNS at step 506. For example referring to FIG. 1, a configured DNS server 120 may be provided on the network 106 to which the DNS request is delegated by local DNS server 118.

At step 508 the specially configured DNS server parses or decomposes the DNS request to obtain the packaged traffic. At step 510 the DNS server then interacts with the desired host for example host 108 and at step 512 composes a packaged DNS response. The packaged DNS response is received via the local DNS server at the DNS proxy and forwarded as any normal DNS response via the SSG to the user device where it is parsed by the configured client application to find the packaged traffic.

In many instances authorization is not required for DNS transactions such that an unauthorized user can package an IP session within multiple DNS request and response transactions. Furthermore it is often not possible to block DNS transactions. For example in many PWLANs, the SESM carries a white list of DNS hosts with which a user device may communicate with prior to authorization. In order to communicate with these hosts the host name needs to be resolved to an IP address by performing a DNS "transaction". By virtue of the hierarchical nature of DNS the request will be handled down to the specially crafted DNS server. Alternatively or in addition the SSG may itself not require authorization for access to certain DNS servers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for limiting DNS transaction bandwidth is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method of Limiting DNS Transaction Bandwidth
4.0 Implementation Mechanisms—Hardware Overview
5.0 Extensions and Alternatives
1.0 General Overview The needs identified in the foregoing Background, and other needs and objects that will become apparent for the following description, are achieved in the present invention, which comprises, in one aspect, a method of limiting DNS transaction bandwidth. A method of limiting domain name server (DNS) transaction bandwidth comprises the steps of intercepting one or more DNS packets, examining said one or more packets for the presence of a suspect transaction criterion and, if said suspect transaction criterion is present, implementing a transaction bandwidth limitation action.

In other aspects, the invention encompasses a computer apparatus and a computer-readable medium configured to carry out the foregoing steps.

2.0 Structural and Functional Overview

Figure 6:
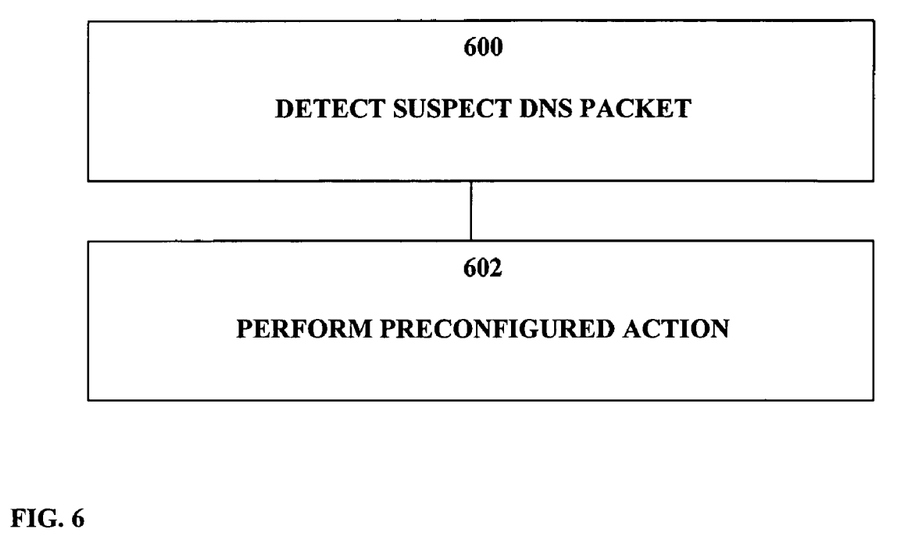
FIG. 6 is a flow diagram illustrating a high level view of a method for limiting DNS transaction bandwidth.

The method described herein can be understood in overview with reference to FIG. 6 which is a high level flow diagram illustrating a method by which tunneling over DNS can be addressed by limiting the available bandwidth. At step 600, suspect packets are detected for example at the DNS proxy. Suspect packets can be identified in any appropriate manner in particular by examining the packets in a DNS transaction for the presence of a suspect transaction, criterion. The criterion may include packet size exceeding a configurable size, packets including suspect record types such as TXT record, records exceeding a configurable size or DNS request or response frequency per user device exceeding a configurable rate. It will be seen that any of these criteria could indicate use of DNS tunneling—for example if the packet size or record size is large it may suggest that a packaged IP payload is included in the packet or record. If the packet includes, for example, a TXT record then this may also indicate a packaged IP packet and if the frequency of DNS requests from a given user device is very high this again may suggest that DNS tunneling is taking place—bearing in mind the relatively small size of DNS packets it may be necessary to break up an IP transaction into multiple DNS requests and response packets. It will be noted that both suspect DNS requests and suspect DNS responses can be detected in this manner.

At step 602 an appropriate pre-configured action is performed on suspect packets. This action may depend on the suspects transaction criterion detected. For example packets that exceed a configurable size can be dropped or delayed, as can be packets with record types or record sizes over a pre-configured size. Alternatively, where suspect record types or sizes are detected, the record can simply be removed from the packets. In addition DNS request or response packets exceeding the configured rate per user device can be delayed or dropped.

As a result the usability of DNS tunneling is limited by enforcing a set of configurable actions on DNS request or response packets that violate configured criteria by dropping or delaying packets or removing records based on the packet size or frequency. Accordingly the effective bandwidth available is reduced rendering DNS tunneling impracticable.

3.0 Method of Limiting DNS Transaction Bandwidths

The method described herein can be understood in more detail with reference to Table 1 below, which illustrates potential suspect transaction criteria, the type of DNS packet to which they may relate and the corresponding action which can be implemented, and to FIG. 7, which is a flow diagram illustrating in more detail the steps carried out.

| Suspect Transaction Criterion | Transaction Bandwidth Limitation Action (Request or Response Packet) |
| --- | --- |
| Packet Size | Drop/Delay |
| Packet Frequency per User Device | Drop/Delay |
| Record Type | Drop/Delay/Remove |
| Record Size | Drop/Delay/Remove |

In the case of packet size as suspect transaction criterion, if this exceeds a configurable size then appropriate actions are taken. The configurable size may be, for example, half of the maximum possible size for a DNS packet. In the case of either a request packet or a response packet the actions may be to drop the packet or to institute a delay.

In the case of the packet frequency exceeding a configurable rate then the request or response packet can be dropped or delayed. The maximum permissible request or response rate can be introduced, for example, as a number of packets per minute, based on the maximum possible payload of each packet, to effectively impose a bandwidth limitation.

In the case of suspect record types such as TXT records and/or CNAME records occurring in the DNS request or response packet then the packet can be dropped or delayed. Alternatively the record can be removed. Alternatively again the suspect records may only be deemed suspect if their size exceeds a configurable limit, for example half the maximum size available for the record, and once again any request or response packets violating this criterion can be dropped, delayed or removed. For example existence of a TXT record or a CNAME record, both of which have significant data payload availability, or those records exceeding a central site may constitute a suspect criterion.

In the case that a delay is imposed, this delay can be, for example, a simple time delay selected so as effectively to limit the data rate and hence bandwidth available for DNS tunneling. The delay may be selected so as to ensure that packets are not dropped because timeout periods are violated.

Of course if the DNS packets do not meet any of the suspect transaction criteria then they can be handled as a normal DNS request.

Figure 7:
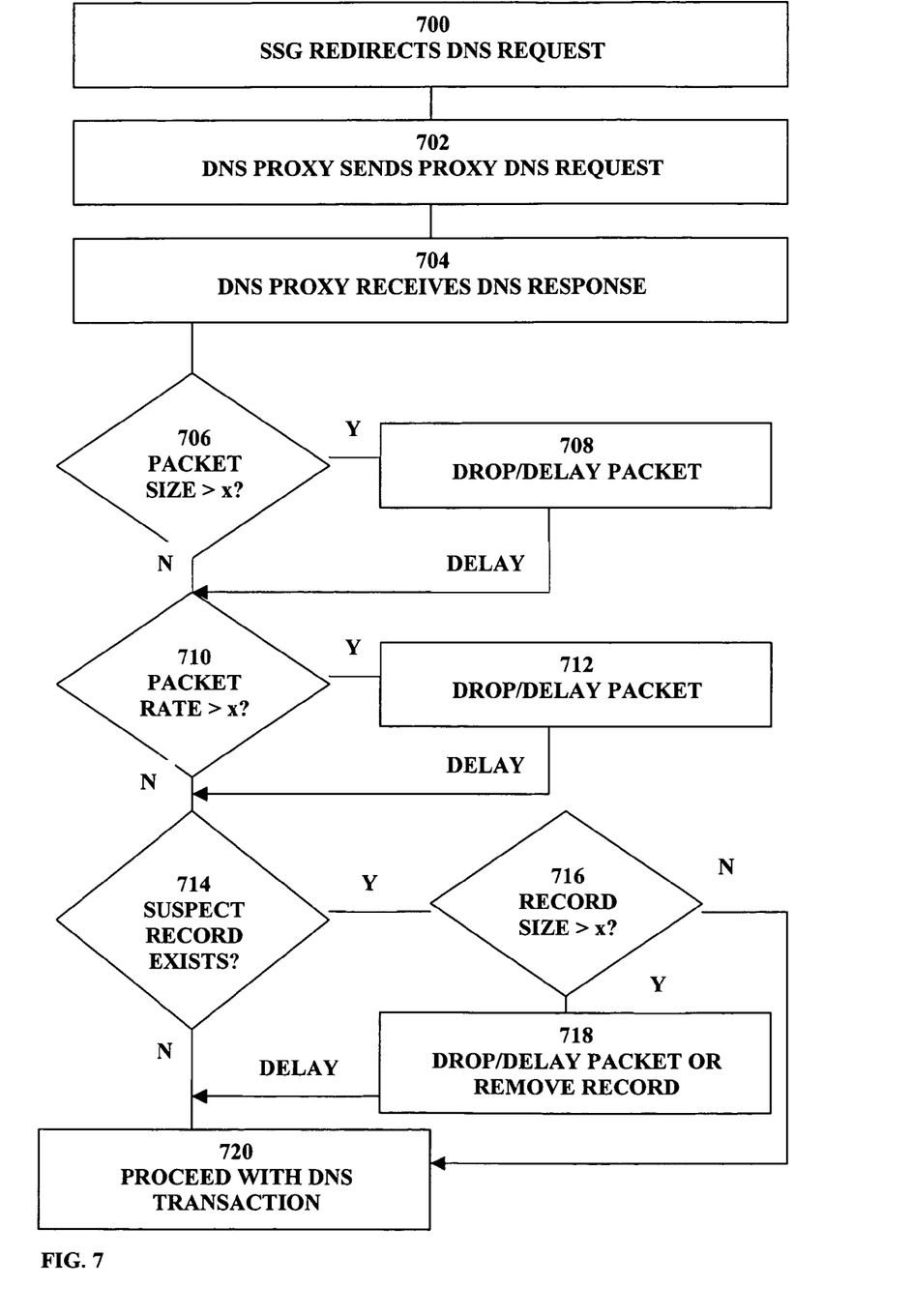
FIG. 7 is a flow diagram illustrating in more detail a method for limiting DNS transaction bandwidth.

In operation, referring to FIG. 7, therefore, at step 700 the SSG redirects the DNS request in the manner described in more detail above. At step 702 the DNS proxy sends the proxy DNS request. At step 704 the DNS proxy receives the DNS response. At step 706 the DNS proxy examines the intercepted packets to establish whether the packet size of either the response or the request packet exceeds a configured limit (x). If the size is exceeded then at step 708 the appropriate action is taken. In particular the packet is dropped or delayed as described above.

If the response packet does not exceed the preconfigured size or if it is delayed then the DNS proxy examines the intercepted packed to see whether the DNS request or response rate exceeds the preconfigured rate (x). If the rate is exceeded then at step 712, once again, the packet is dropped or delayed. If not, or the packet is delayed, then at step 714 the DNS proxy examines whether the record type is a suspect type. If so then optionally the DNS proxy may examine whether the record size exceeds the preconfigured limit (x) at step 716 and if so it can drop or delay the packet or remove the record at step 718. Alternatively if a suspect record is detected at step 714 then the process may proceed straight to step 718 and drop it, delay the packet or remove the record. If, however, there is no suspect record or, optionally, the record size does not exceed the preconfigured size, or the packet is only delayed, then at step 720 the DNS proxy can proceed with the DNS transaction as normal. It will be noted, that if the action at any of steps 708, 712, or 718 is to delay the packet or remove the record then, subsequently, the DNS transaction can nonetheless proceed as normal but at a delayed rate or with the appropriate record removed. In addition even if the packet is delayed at one of those steps, the additional checks are optionally carried out as this can provide a bandwidth limitation by combination of delay and packet size limitation; the effect of 2 sec delay+60 Byte size limit is greater that 2 sec delay with any packet size. In other words the approach accumulated actions based on packet criteria and then applies the actions at the end. If any of the actions is to drop a packet, no other action needs to be performed.

It will further be seen that the steps described above can be performed in any appropriate order. For example the step 706, 710, 714 and 716 in which the intercepted packets are examined for suspect transaction criteria can be rearranged as appropriate. In addition, prior to the DNS proxy sending the proxy DNS request to step 702 the received DNS request packet can be examined to see whether for example at least any of the packet size or frequency criteria are violated in which case the proxy DNS request can be suppressed or delayed as appropriate, as a suspect transaction will have already been identified.

In particular it will be seen that disallowing records or reducing their rate or size where they can include relatively large amounts of data will force users attempting to use DNS tunneling to use different or smaller records resulting in effective bandwidth limitation.

It will further be seen that the interception of packets, examination and implementation of appropriate actions can be performed at the DNS proxy without significant extension of its existing tasks. Alternatively, of course, any other entity can carry out the respective steps for example an entity at the SSG or elsewhere.

The method described can be implemented in relation to any network in which a user can perform DNS requests without authorization, not limited to wireless networks but including dial up, wired and broadband connections The method steps described can be coded or implemented in any manner and at any appropriate location as will be apparent to the skilled reader.

4.0 Implementation Mechanisms—Hardware Overview

Figure 8:
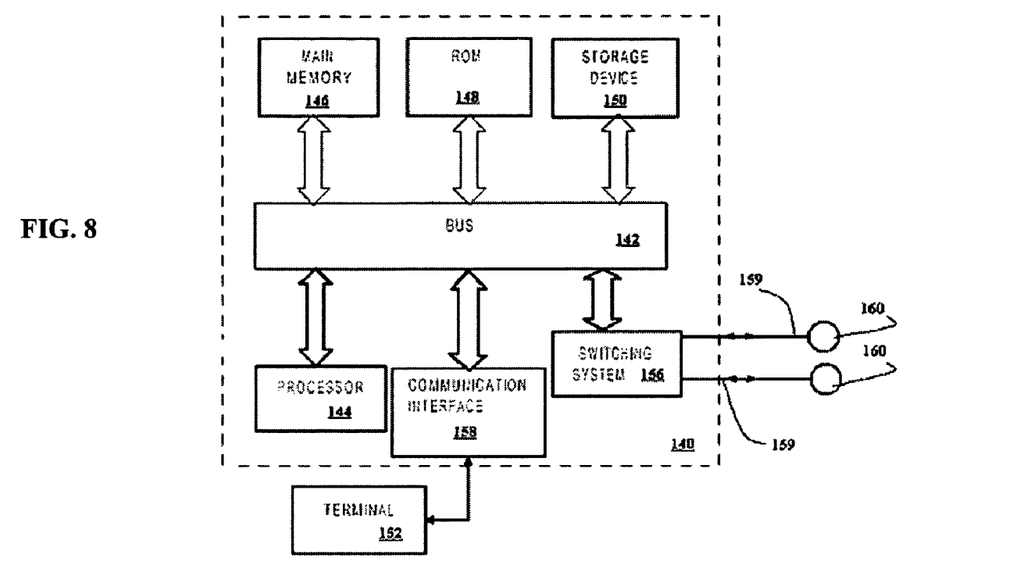
FIG. 8 is a block diagram illustrating a computer system upon which a method of limiting DNS transaction bandwidth may be implemented.

FIG. 8 is a block diagram that illustrates a computer system 140 upon which the method may be implemented. The method is implemented using one or more computer programs running on a network element such as a router device. Thus, in this embodiment, the computer system 140 is a computer connected to a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a DNS proxy the above-described method of identifying a policy server. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the worldwide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

Any appropriate communication protocol and mechanism can be adopted to implement the invention. The method steps set out can be carried out in any appropriate order and aspects from the examples and embodiments described juxtaposed or interchanged as appropriate.

It will further be recognized that any appropriate network configuration can be implemented and in relation to any network element intercepting and examining the DNS packets. Any gateway and management protocol can be adopted, not limited to SSG/SESM. Furthermore any appropriate suspect criteria can be introduced and monitored in any appropriate manner, and any appropriate action can be implemented to reduce the practicability of DNS tunneling.

What is claimed is:

1. A method comprising:
   intercepting one or more Domain Name System (DNS) packets that are part of a DNS tunnel,
   examining a DNS packet of said one or more DNS packets for a suspect DNS record of a suspect DNS record type,
   wherein said suspect DNS record type is selected from the group consisting of a CNAME record type and a TXT record type,
   in response to determining that said DNS packet contains a suspect DNS record of a suspect DNS record type, then determining a size of said suspect DNS record, in response to determining that said size of said suspect DNS record exceeds a threshold, removing said suspect DNS record from said DNS packet, and allowing a DNS transaction comprising said DNS packet to proceed but with said suspect DNS record removed from said DNS packet, wherein the method is performed by one or more computing devices.

2. A method as claimed in claim 1 in which the DNS packet comprises one of a DNS request or a DNS response packet.

3. A method as claimed in claim 1 in which the DNS packet includes one or more records selected from the group consisting of an A record, a CNAME record, and a TXT record.

4. A method as claimed in claim 1 performed at a DNS proxy.

5. A method as claimed in claim 4 comprising the step of intercepting a DNS request packet and sending a DNS proxy request packet.

6. A method as claimed in claim 5 comprising examining the DNS request packet and/or a response packet received in response to the proxy DNS request packet.

7. A method as claimed in claim 1 in which the DNS transaction is carried out between a client and a host on a network.

8. A method as claimed in claim 7 in which the client and host communicate via one of a public wireless local area network (PWLAN), broadband or dial up connection to a network.

9. A volatile or a non-volatile computer readable non-transitory storage medium storing one or more sequences of instructions which, when executed by one or more processors, cause the one or more processors to perform:

intercepting one or more Domain Name System (DNS) packets that are part of a DNS tunnel, examining a DNS packet of said one or more DNS packets for a DNS record of a suspect DNS record type, wherein said suspect DNS record type is selected from the group consisting of a CNAME record type and a TXT record type, in response to determining that said DNS packet contains a suspect DNS record of a suspect DNS record type, then determining a size of said suspect DNS record, in response to determining that said size of said suspect DNS record exceeds a threshold, removing said suspect DNS record from said DNS packet, and allowing a DNS transaction comprising said DNS packet to proceed but with said suspect DNS record removed from said DNS packet.

10. An apparatus comprising:
one or more processors, and
a network interface operatively coupled to the one or more processors, and a volatile or a non-volatile computer readable medium comprising one or more sequences of instructions which, when executed by the one or more processors, cause the one or more processors to perform:

intercepting one or more Domain Name System (DNS) packets that are part of a DNS tunnel, examining a DNS packet of said one or more DNS packets for a DNS record of a suspect DNS record type, wherein said suspect DNS record type is selected from the group consisting of a CNAME record type and a TXT record type, if said DNS packet contains a suspect DNS record of a suspect DNS record type, then determining a size of said suspect DNS record, if said size of said suspect DNS record exceeds a threshold, then removing said suspect DNS record from said DNS packet, and allowing a DNS transaction comprising said DNS packet to proceed but with said suspect DNS record removed from said DNS packet.

11. The volatile or a non-volatile computer readable non-transitory storage medium of claim 9, wherein the DNS packet comprises one of a DNS request or a DNS response packet.

12. The volatile or a non-volatile computer readable non-transitory storage medium in claim 9, wherein the DNS packet includes one or more records selected from the group consisting of an A record, a CNAME record, and a TXT record.

13. The volatile or a non-volatile computer readable non-transitory storage medium of claim 9 performed at a DNS proxy.

14. The volatile or a non-volatile computer readable non-transitory storage medium of claim 13, further storing instructions for intercepting a DNS request packet and sending a DNS proxy request packet.

15. The volatile or a non-volatile computer readable non-transitory storage medium of claim 14, further storing instructions for examining the DNS request packet and/or a response packet received in response to the DNS proxy request packet.

16. The volatile or a non-volatile computer readable non-transitory storage medium of claim 9, wherein the DNS transaction is carried out between a client and a host on a network.

17. The volatile or a non-volatile computer readable non-transitory storage medium of claim 16, wherein the client and host communicate via one of a public wireless local area network (PWLAN), broadband or dial up connection to a network.

* * * * *